US012588082B2

(12) United States Patent
Yang

(10) Patent No.: US 12,588,082 B2
(45) Date of Patent: Mar. 24, 2026

(54) COMMUNICATION ESTABLISHMENT METHOD AND APPARATUS AND STORAGE MEDIUM

(71) Applicant: VIVO MOBILE COMMUNICATION CO., LTD., Guangdong (CN)

(72) Inventor: Zhangbao Yang, Zhejiang (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 301 days.

(21) Appl. No.: 18/361,031

(22) Filed: Jul. 28, 2023

(65) Prior Publication Data

US 2023/0371088 A1     Nov. 16, 2023

Related U.S. Application Data

(63) Continuation of application No. PCT/CN2022/074887, filed on Jan. 29, 2022.

(30) Foreign Application Priority Data

Feb. 4, 2021     (CN) .......................... 202110157381.4

(51) Int. Cl.
| | |
|---|---|
| *H04W 4/02* | (2018.01) |
| *H04W 8/18* | (2009.01) |
| *H04W 76/10* | (2018.01) |
| *H04W 88/02* | (2009.01) |
| *H04W 88/06* | (2009.01) |
| *H04W 92/02* | (2009.01) |

(52) U.S. Cl.
CPC ............. *H04W 76/10* (2018.02); *H04W 8/18* (2013.01)

(58) Field of Classification Search
CPC ....... H04W 4/21; H04W 76/11; H04W 76/10; H04W 4/12; H04W 4/16; H04W 8/18; H04W 88/18; Y02D 30/70
USPC ....................................................... 455/422.1
See application file for complete search history.

(56) References Cited

U.S. PATENT DOCUMENTS

| | | | |
|---|---|---|---|
| 2006/0281407 | A1 | 12/2006 | Deeds |
| 2023/0388782 | A1* | 11/2023 | Ma .......................... G06F 21/84 |

FOREIGN PATENT DOCUMENTS

| | | |
|---|---|---|
| CN | 101247440 A | 8/2008 |
| CN | 102547615 A | 7/2012 |
| CN | 103428238 A | 12/2013 |
| CN | 103533185 A | 1/2014 |
| CN | 104243731 A | 12/2014 |
| CN | 104469662 A | 3/2015 |

(Continued)

OTHER PUBLICATIONS

IP.com search history (Year: 2025).*
First Korean Office Action for Korean Patent Application No. 10-2023-7027749 sent Feb. 13, 2026, 11 pages.

*Primary Examiner* — Moustapha Diaby
(74) *Attorney, Agent, or Firm* — Price Heneveld LLP

(57) ABSTRACT

The present application discloses a communication establishment method and apparatus and a storage medium, and belongs to the technical field of communication. The method includes: establishing a target communication connection with a target user through a second user in a process of communicating with the second user, and communicating with the target user based on the target communication connection. The personal information of the target user is hidden in the target communication connection.

6 Claims, 11 Drawing Sheets

(56) References Cited

FOREIGN PATENT DOCUMENTS

| CN | 106921964 | A | 7/2017 |
|----|-----------|---|--------|
| CN | 106992957 | A | 7/2017 |
| CN | 107147815 | A | 9/2017 |
| CN | 110290472 | A | 9/2019 |
| CN | 111182159 | A | 5/2020 |
| CN | 112217890 | A | 1/2021 |
| CN | 112996138 | A | 6/2021 |
| KR | 20040106655 | A | 12/2004 |
| KR | 20080042218 | A | 5/2008 |
| WO | 2020093854 | A1 | 5/2020 |

* cited by examiner

COMMUNICATION ESTABLISHMENT METHOD AND APPARATUS AND STORAGE MEDIUM

CROSS-REFERENCE TO RELATED APPLICATIONS

The present application is a continuation application of PCT Application No. PCT/CN2022/074887 filed on Jan. 29, 2022, which claims priority to Chinese Patent Application No. 202110157381.4, filed with the China National Intellectual Property Administration on Feb. 4, 2021 and entitled "COMMUNICATION ESTABLISHMENT METHOD AND APPARATUS AND STORAGE MEDIUM", disclosures of which are incorporated herein by reference in their entireties.

TECHNICAL FIELD

The present application belongs to the technical field of communication, and specifically relates to a communication establishment method and apparatus and a storage medium.

BACKGROUND

Smartphones have become an indispensable part of people's lives. People's daily communication and social connections are inseparable from call conversations on mobile phones, or texts, voice, and calls of social software such as WeChat and QQ. Currently, mobile phone communication calls all require dial of mobile phone numbers of a target user to implement the calls. In social software, a user also needs to know the ID (Identification) of the other party, and implement network calls and other communication by adding the other party as a friend.

In the process of implementing the present application, the inventor found that the existing call communication method has at least the following problems:

1. The user must know mobile phone numbers or a network ID of the other party to implement communication, which brings inconvenience to the user.
2. When users A and B are friends in the address book and users B and C are friends in the address book, if user A wants to contact friend C who is not in the address book, user B often needs to tell mobile phone numbers or a network ID of user C to user A. This leaks C's privacy and make B embarrassed.

SUMMARY

In a first aspect, the embodiment of the present application provides a communication establishment method, applied to a first electronic device of a first user, and the method includes:

establishing a target communication connection with a target user through the second user during communication with a second user; and communicating with the target user based on the target communication connection;

where personal information of the target user is hidden in the target communication connection.

In a second aspect, the embodiment of the present application provides a communication establishment method, applied to the cloud, and the method includes:

receiving a communication assistance request from a second user; where the communication assistance request is generated by a second electronic device of the second user in response to input from the second user during communication between a first user and the second user; and establishing a target communication connection between the first user and a target user based on the assistance communication request, so that the first user can communicate with the target user based on the target communication connection;

where personal information of the target user is hidden in the target communication connection.

In a third aspect, the embodiment of the present application provides a communication establishment apparatus, applied to a first electronic device of a first user, and the apparatus includes:

a first communication connection establishment module, configured to establish a target communication connection with a target user through the second user during communication with a second user; and a first communication module, configured to communicate with the target user based on the target communication connection;

where personal information of the target user is hidden in the target communication connection.

In a fourth aspect, the embodiment of the present application provides a communication establishment apparatus, applied to the cloud, and the apparatus includes:

a first receiving module, configured to receive a communication assistance request from a second user; where the communication assistance request is generated by a second electronic device of the second user in response to input from the second user during communication between a first user and the second user; and a third communication connection establishment module, configured to establish a target communication connection between the first user and a target user based on the assistance communication request, so that the first user can communicate with the target user based on the target communication connection;

where personal information of the target user is hidden in the target communication connection.

According to a third aspect, the embodiment of the present application provides an electronic device, where the electronic device includes a processor, a memory, and a program or an instruction stored in the memory and executable on the processor, and when the program or the instruction is executed by the processor, the steps of the communication establishment method according to the first aspect or the second aspect are implemented.

According to a sixth aspect, the embodiment of the present application provides a readable storage medium. The readable storage medium stores a program or an instruction, and when the program or the instruction is executed by a processor, the steps of the communication establishment method according to the first aspect or the second aspect are implemented.

According to a seventh aspect, the embodiment of the present application provides a chip, where the chip includes a processor and a communications interface, the communications interface is coupled to the processor, and the processor is configured to run a program or an instruction, to implement steps of the communication establishment method according to the first aspect or the second aspect.

BRIEF DESCRIPTION OF DRAWINGS

To describe the technical solutions in the embodiments of the present application or in the prior art more clearly, the following briefly introduces the accompanying drawings for describing the embodiments or the prior art. Apparently, the accompanying drawings in the following description show merely some embodiments of the present application, and a person of ordinary skill in the art may still derive other drawings from the accompanying drawings.

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art shall fall within the protection scope of the present application.

The terms "first", "second", and the like in the description and the claims of the present application are used to distinguish between similar objects instead of describing a specific order or sequence. It should be understood that, data termed in such a way is interchangeable in proper circumstances, so that the embodiments of the present application can be implemented in an order other than the order illustrated or described herein.

It should be understood that "one embodiment" or "an embodiment" mentioned in the specification means that specific features, structures or characteristics related to the embodiment are included in at least one embodiment of the present application. Thus, appearances of "in one embodiment" or "in an embodiment" in various places throughout the specification are not necessarily referring to the same embodiment. Furthermore, the specific features, structures or characteristics may be combined in any suitable manner in one or more embodiments.

In various embodiments of the present application, it should be understood that the sequence numbers of the following processes do not mean the order of execution, and the execution order of each process should be determined by its functions and internal logic, and should constitute no limitation on the implementation process of the embodiments of the present application.

In addition, in the specification and claims, "and/or" represents at least one of connected objects, and a character "/" generally represents an "or" relationship between associated objects.

With reference to the accompanying drawings, the following describes in detail a communication establishment method and apparatus and a storage medium in the embodiments of the present application based on specific embodiments and application scenarios.

Figure 1:
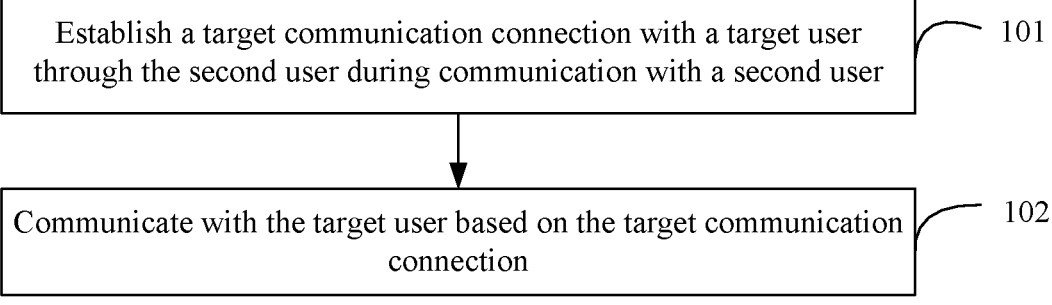
FIG. 1 is a schematic flowchart 1 of a communication establishment method provided by an embodiment of the present application.

FIG. 1 is a schematic flowchart 1 of a communication establishment method provided by an embodiment of the present application. The method is applied to the first electronic device of the first user, and as shown in FIG. 1, the method includes:

Step 101: Establish a target communication connection with a target user through the second user during communication with a second user.

Specifically, when user A (the first user) has user B (the second user) in the address book, user B has user C (a target user) in the address book, but user A does not have user C in the address book, in the prior art, if user A wants to contact user C, user A can only obtain C's contact information from user B first, and then contact user C, which undoubtedly causes the privacy of user C to be leaked. Based on this, in order to realize the communication between user A and user C while protecting the privacy of user C, the embodiment of the present application utilizes a method in which user B assists in realizing the communication connection between user A and user C:

User A can first establish communication with user B through a communication establishment apparatus in the first electronic device, and in the process of communicating with user B, inform user B that user A wants to communicate with user C and ask user B for help. Of course, user A may also inform user B in advance that user A wants to communicate with user C, and then establish communication with user B. During the communication process, user B inputs a communication assistance instruction to a second electronic device of user B based on a request of user A. The second electronic device generates a communication assistance request in response to the input of user B, and sends the request to the cloud. The cloud receives the communication assistance request from the second electronic device, and assists in establishing a communication connection between user A and user C.

User B preferably inputs the communication assistance instruction on a communication interface with user A. Of course, user B can also input the instruction on other interfaces, which is not specifically limited in this embodiment of the present application. For an input manner of the instruction and a response manner of the second electronic device of user B, corresponding means in the prior art may be used, which is not specifically limited in this embodiment of the present application.

It is worth noting that account information of the first user is logged in, or a SIM (Subscriber Identity Module) card of the first user is installed on the first electronic device of the first user, that is, the first electronic device is not necessarily a device belonging to the first user. It can be understood that the same applies to the electronic devices of the second user and the target user, and details will not be repeated herein.

Step 102: Communicate with the target user based on the target communication connection.

Personal information of the target user is hidden in the target communication connection.

Specifically, after the cloud receives the assistance communication request, the cloud can determine, based on the assistance communication request, two communication parties (that is, user A and user C) that establish communication, establish the target communication connection, and transfer communication information of user A to user C. The personal information of the target user is hidden in the target communication connection, so as to protect the privacy of the target user during normal communication. It can be understood that the communication assistance request includes indication information of the two communication parties that establish communication, and the indication information may be determined based on the input of user B.

It is worth noting that when the second electronic device of user B sends the communication assistance request, the second electronic device also feeds back, to user A, an indication message that has requested assistance. In this case, the communication establishment apparatus in the first electronic device of user A automatically sends communication information to the cloud, and then the cloud sends the communication information to user C, to communicate with user C. The communication information may be a call request, such as a mobile phone call request or a social software call request, or a communication message, such as a mobile phone text message or a text, voice, or picture message of social software.

In the communication establishment method provided in the embodiments of the present application, in the process of communicating with the second user, the target communication connection is established with the target user through the second user, and based on the target communication connection, communication is performed with the target user. The personal information of the target user is hidden in the target communication connection, so that communication can be implemented without knowing mobile phone numbers or a network ID of the other party, and the problems of inconvenient user operation and privacy leakage are avoided.

Optionally, based on the foregoing embodiment, the first user communicates with the second user and the target user respectively based on a telephone call; and after communicating with the target user, the method further includes:

requesting to display personal information of the target user in plaintext based on a call record;

obtaining the personal information of the target user in a case that the target user agrees to the request; and establishing a first communication connection with the target user, where the personal information of the target user is unhidden in the first communication connection.

Figure 2:
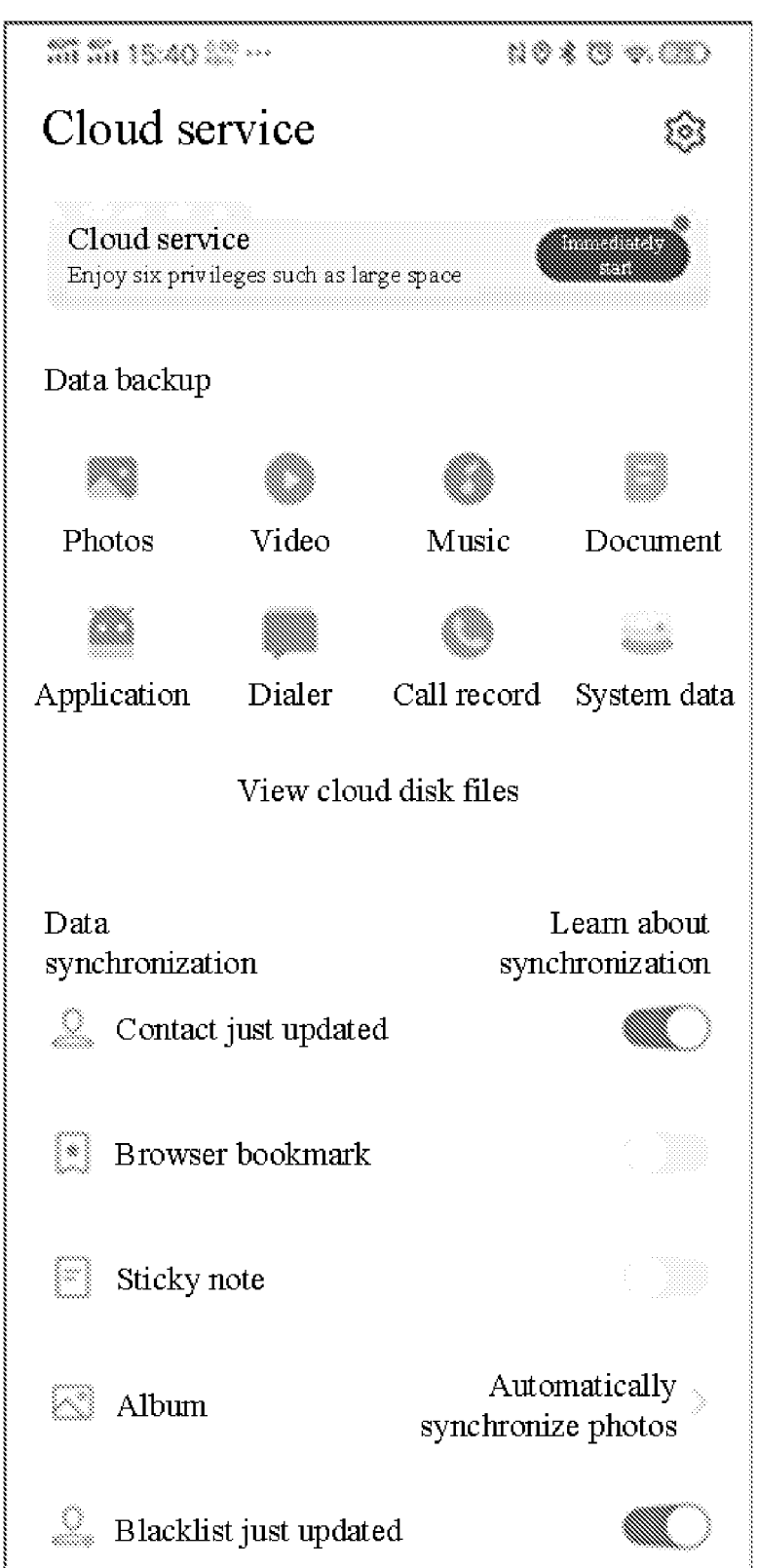
FIG. 2 is a schematic diagram of an interface for enabling a cloud service contact synchronization function provided by an embodiment of the present application.

Specifically, user B is a user who has enabled the contact data synchronization function in the cloud service, contact information in the second electronic device of user B is backed up in the cloud, and the contacts include contacts in a mobile phone address book and a social software address book. FIG. 2 is a schematic diagram of an interface for enabling a cloud service contact synchronization function provided by an embodiment of the present application.

Figure 3:
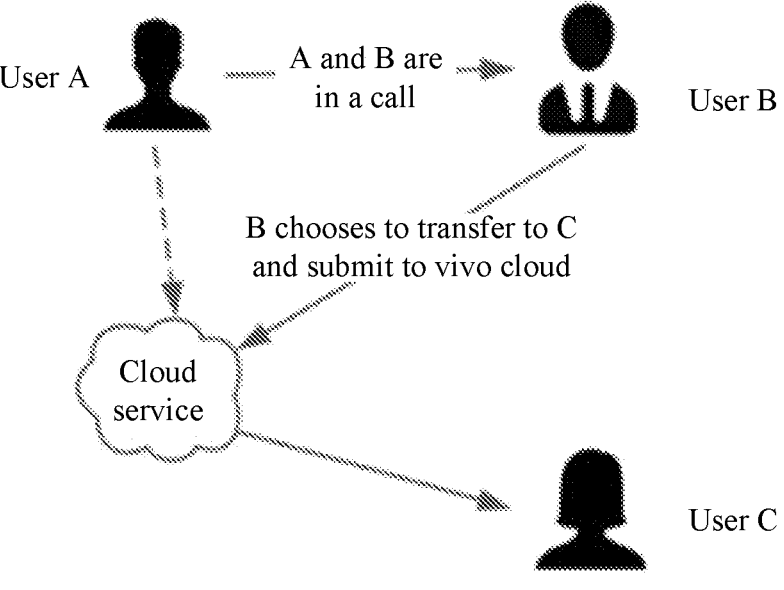
FIG. 3 is a schematic diagram 1 of an interaction process for establishing communication provided by an embodiment of the present application.
Figure 4:
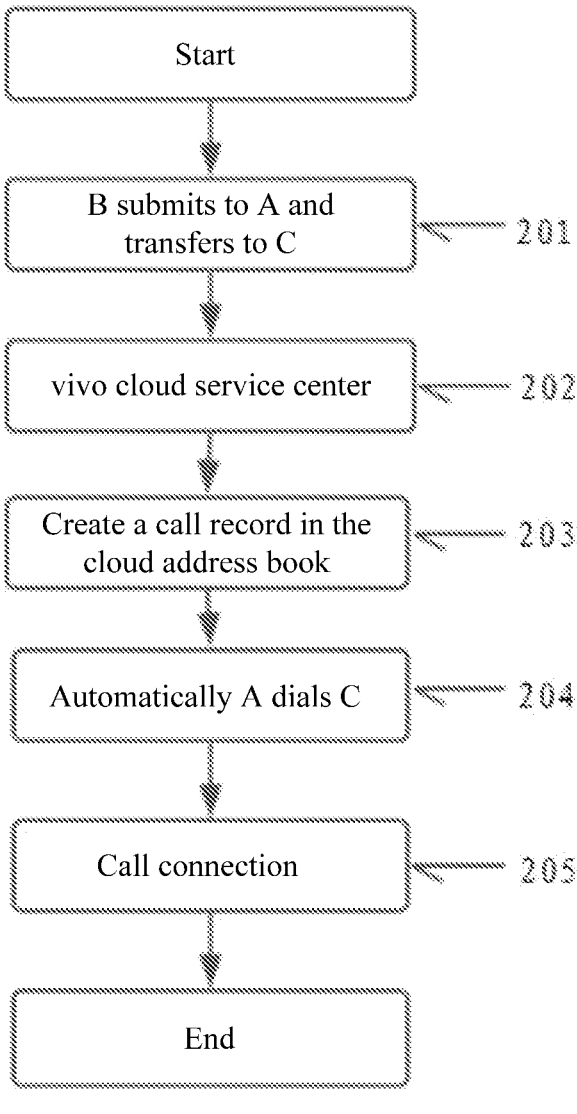
FIG. 4 is a schematic diagram 1 of a specific process for establishing communication provided by an embodiment of the present application.

FIG. 3 is a schematic diagram 1 of an interaction process for establishing communication provided by an embodiment of the present application. FIG. 4 is a schematic diagram 1 of a specific process for establishing communication provided by an embodiment of the present application. As shown in FIG. 3 and FIG. 4, the communication establishment method corresponding to the case of a call through a mobile phone includes the following steps:

Step 201: B selects a transfer function during a call between A and B, and selects C in the address book.

User B can select the transfer function through a corresponding operation button on the call interface with user A, and further select C in the mobile phone address book. Certainly, user B may also trigger the transfer function in other manners, which is not specifically limited in this embodiment of the present application. After user B completes the operation, a mobile phone (the second electronic device) of user B generates a transfer request (that is, a communication assistance request).

Step 202: A vivo cloud service center receives the transfer request.

Step 203: The cloud service enters the address book to automatically establish a record of a relationship between A and C.

Specifically, after receiving the transfer request, the cloud service center establishes a target communication connection based on indication information in the transfer request, so as to transfer the call request from user A to user C.

Step 204: A automatically dials the cloud service center, and the cloud service center transfers to C.

Step 205: A and C communicate normally.

Specifically, after user B completes the operation, the mobile phone of user B sends a transfer request, and at the same time feeds back, to user A, an indication message that has requested assistance. At this time, the communication establishment apparatus in the mobile phone (the first electronic device) of user A automatically dials the cloud service center, and the cloud service center transfers the call to user C, so that users A and C can have a telephone conversation.

Figure 5:
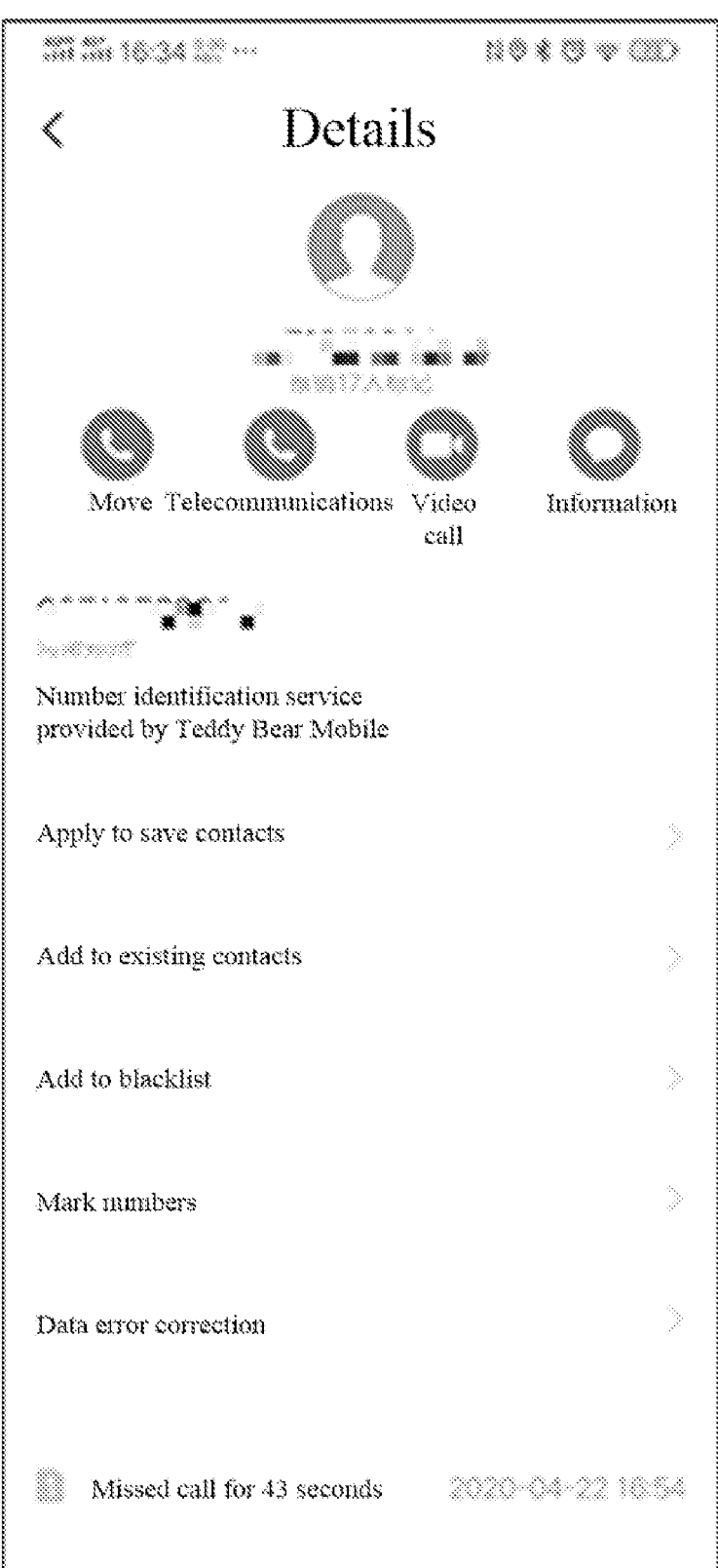
FIG. 5 is a schematic diagram of a call record display interface provided by an embodiment of the present application.

In the above process, regardless of whether user C accepts the call or not, a call record that does not display the mobile phone numbers will be created on both mobile phones. FIG. 5 is a schematic diagram of a call record display interface provided by an embodiment of the present application After the communication information of user A is sent to user C, a communication record will be generated in both electronic devices. In the communication record, the personal information of user C is hidden, that is, not displayed in plaintext, to protect user privacy. User A may input a contact saving instruction on the communication record interface, and the contact saving instruction may be saved in plaintext or in non-plaintext.

If user A chooses to save in non-plaintext, personal information of user C will be saved in non-plaintext in the address book of the first electronic device of user A. When user A wants to contact user C later, user A can search for user C in the address book and send a communication message. If user A chooses to save in plaintext, the first electronic device of user A generates a request to save the contact in plaintext and sends the request to the third electronic device of user C. If user C agrees to the request, the communication establishment apparatus in the first electronic device of user A can obtain the personal information of user C from the cloud.

The personal information includes contact information, that is, mobile phone numbers or social software IDs such as WeChat account numbers. After the contact is saved in plaintext, user A and user C can communicate normally. In the case of mobile phone numbers, subsequently user A can directly call user C through the mobile phone numbers; in the case of a social software ID, subsequently user A can add user C as a friend through the ID, and communicate normally based on social software.

It is worth noting that user C can also save user A as a contact based on the communication record in the third electronic device. A specific implementation manner is similar to the above-mentioned manner in which user A saves user C as a contact, and will not be repeated herein.

For the case of a mobile phone call, user A can choose to hide the mobile phone numbers and save user C to the address book for subsequent calls; and user A can also apply to save the contact in plaintext. After user C agrees, the communication establishment apparatus in the mobile phone of user A can obtain the mobile phone numbers of user C, and establish a first communication connection (that is, a normal telephone communication connection) with the target user, and subsequently user A can make a normal telephone call to user C based on the first communication connection.

Optionally, in the communication establishment method provided in the embodiment of the present application, the first user communicates with the second user and the target user respectively based on a telephone call, and requests to display the personal information of the target user in plaintext based on the call record, obtains the personal information of the target user when the target user agrees to the request, and establishes a first communication connection with the target user, where the personal information of the target user is unhidden in the first communication connection, to enable telephone calls between users while avoiding user operation inconvenience and privacy leakage.

Optionally, based on the above embodiment, the first user communicates with the second user and the target user respectively based on social software; and after communicating with the target user, the method further includes:

requesting to display personal information of the target user in plaintext based on a communication record; and unhiding the personal information of the target user in the target communication connection when the target user agrees to the request.

Specifically, the first user may also communicate with the second user and the target user respectively based on social software, similar to the situation of a mobile phone call, after communicating with the target user, a communication record is generated in an electronic device, based on the communication record, the first user can request user C to display personal information in plaintext, and if the target user agrees to the request, the personal information of the target user in the target communication connection is unhidden.

In the communication establishment method provided in the embodiment of the present application, the first user communicates with the second user and the target user respectively based on social software, and after communicating with the target user, the method further includes: requesting to display the personal information of the target user in plaintext based on the communication record, and if the target user agrees to the request, unhiding the personal information of the target user in the target communication connection, which can provide contact information based on the user intent to avoid the problem of privacy leakage.

Optionally, based on the above embodiment, after the unhiding the personal information of the target user in the target communication connection, the method further includes:

requesting to add the target user as a social software friend based on the unhidden personal information of the target user.

Specifically, after unhiding the personal information of the target user in the target communication connection, the first user may request to add the target user as a social software friend based on the unhidden personal information of the target user, to normally communicate through social software subsequently.

Figure 6:
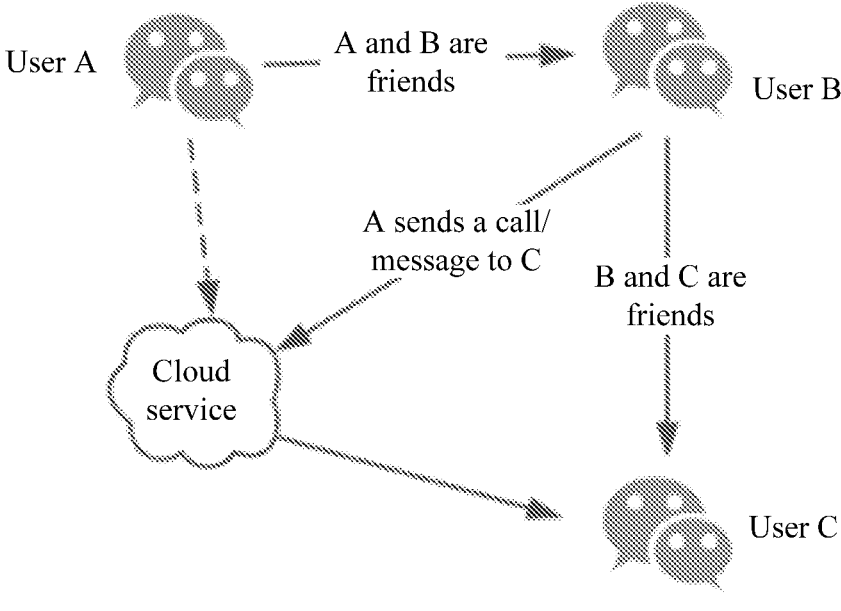
FIG. 6 is a schematic diagram 2 of an interaction process for establishing communication provided by an embodiment of the present application.
Figure 7:
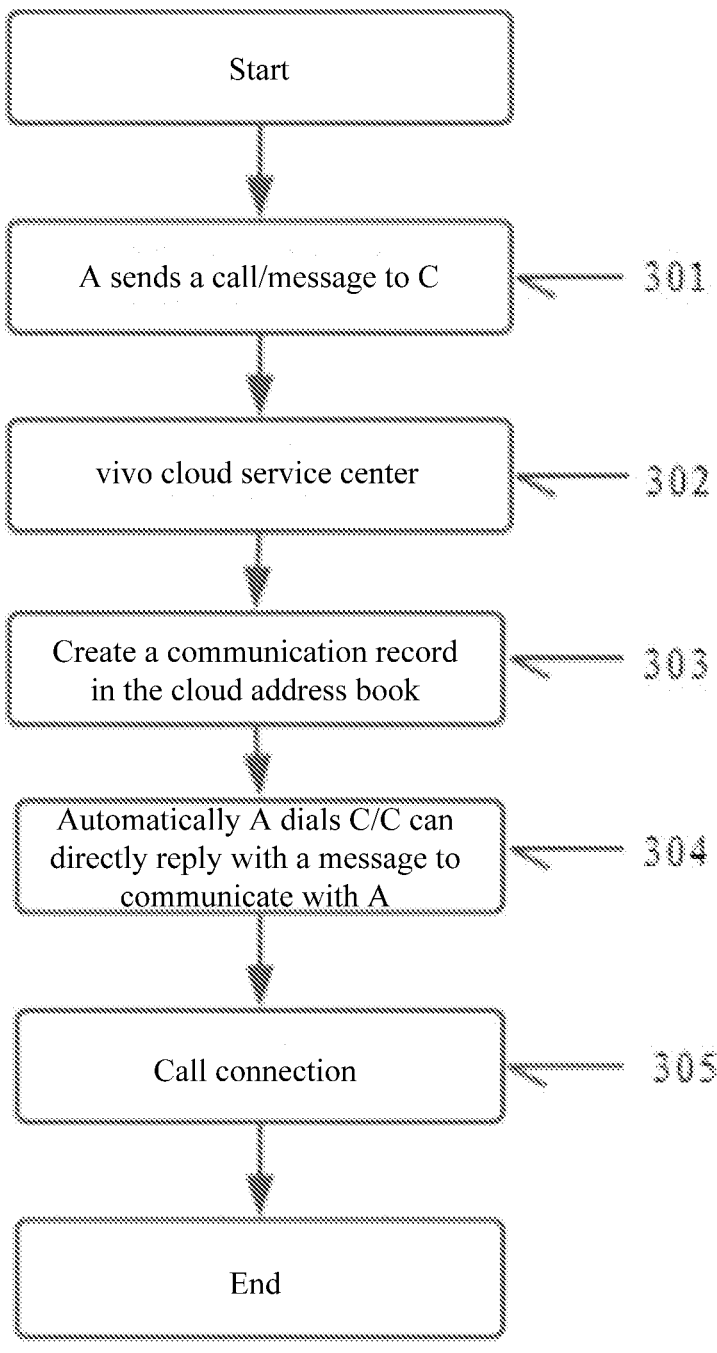
FIG. 7 is a schematic diagram 2 of a specific process for establishing communication provided by an embodiment of the present application.

Optionally, the first user, the second user, and the target user respectively correspond to the same type of social software. FIG. 6 is a schematic diagram 2 of an interaction process for establishing communication provided by an embodiment of the present application. FIG. 7 is a schematic diagram 2 of a specific process for establishing communication provided by an embodiment of the present application. As shown in FIG. 6 and FIG. 7, the communication establishment method corresponding to the case of communication through a same type of social software (with WeChat as an example) includes the following steps:

Step 301: A and B are WeChat friends, and B selects a transfer function and selects C in the address book.

Specifically, user B can select the transfer function through the corresponding operation button on the WeChat call (voice call or video call) interface with user A, and further select C in the WeChat address book. Certainly, user B may also trigger the transfer function in other manners, which is not specifically limited in this embodiment of the present application. After user B completes the operation, the second electronic device of user B generates a transfer request (that is, a communication assistance request).

Step 302: A vivo cloud service center receives the transfer request.

Step 303: The cloud service enters the address book to automatically establish a record of a relationship between A and C.

Specifically, after receiving the transfer request, the cloud service center enters the cloud address book (the WeChat address book) of user B to establish a relationship record between user A and C based on indication information in the transfer request, and establishes a target communication connection, so as to transfer the call request from user A to user C.

Step 304: A automatically dials the cloud service center, and the cloud service center transfers to C or C agrees to receive information of friend A of B and can directly reply to A through a communication input box with B.

Specifically, after user B completes the operation, the second electronic device of user B sends a transfer request, and at the same time feeds back, to user A, an indication message that has requested assistance. At this time, the first electronic device of user A automatically dials the cloud service center (send voice or video call requests to the cloud service center), and the cloud service center transfers the call to user C, so that users A and C can have a voice or video call.

In the case of sending a message, this can also be based on a similar method, that is, user A sends a message to user B through WeChat, and user B triggers a communication assistance request, the communication establishment apparatus in the first electronic device of user A automatically sends the message to the cloud service center, and the cloud service center sends the message to user C, so that users A and C can communicate via WeChat messages normally.

After the record of the relationship between user A and C is established, user A can send a communication message to C through the WeChat chat window with user B, but when sending the message, user A needs to indicate whether to send the message to user B or user C. If the message is sent to user C, the message is automatically sent to the cloud service center, and sent to user C through the cloud service center. User C can also reply the communication message to A through the WeChat chat window with user B, but when sending a message, user C needs to indicate whether the message is sent to user B or user A. If the message is sent to user A, the message is automatically sent to the cloud service center, and then sent to user A through the cloud service center. For the sake of humanity, when the above method is adopted, the communication message can be set to be invisible to user B.

Of course, a new WeChat chat window may be created in each of the electronic devices of user A and user C, so as to realize the communication between the two users through the cloud and avoid causing unnecessary disturbance to user B.

Step 305: A and C communicate normally or add friends directly.

Specifically, in the above process, regardless of whether user C accepts the call or not, a call record that does not display the WeChat account numbers is created on the electronic devices of both parties. Subsequently user A and user C can communicate with each other through the call record.

At the same time, user A or C can choose to hide WeChat personal information and save the other party in the address book for subsequent communication. Of course, user A or C can also apply to save the contact in plaintext. After the other party agrees, the communication establishment apparatus in the first electronic device automatically synchronizes the cloud WeChat account numbers to the address book of user A or C. Considering that saving contacts in the WeChat application is equivalent to adding friends and requires the consent of the other party, the address book herein can be a new temporary address book different from the WeChat address book, and is used to establish a temporary call through the communication establishment apparatus. After the communication establishment apparatus obtains the cloud WeChat account numbers, the user can perform the operation of adding friends based on the WeChat account numbers, and can communicate normally through the WeChat application after the addition is successful.

In the communication establishment method provided in the embodiment of the present application, the apparatus requests to add the target user as a social software friend based on the unhidden personal information of the target user, which can provide contact information based on the user intent to avoid the problem of privacy leakage while ensuring normal communication.

Optionally, based on the above embodiment, the first user may communicate with the second user and the target user respectively based on social software; where the first user and the second user correspond to the same type of social software, and the first user and the target user correspond to different social software types; and after communicating with the target user, the method further includes:

requesting to display personal information of the target user in plaintext based on a communication record;

unhiding the personal information of the target user in the target communication connection when the target user agrees to the request; and requesting to add the target user as a social software friend through a first account based on the unhidden personal information of the target user, where the first account is an account of the first user in a target social software, and the target social software is social software corresponding to the target user.

Figure 8:
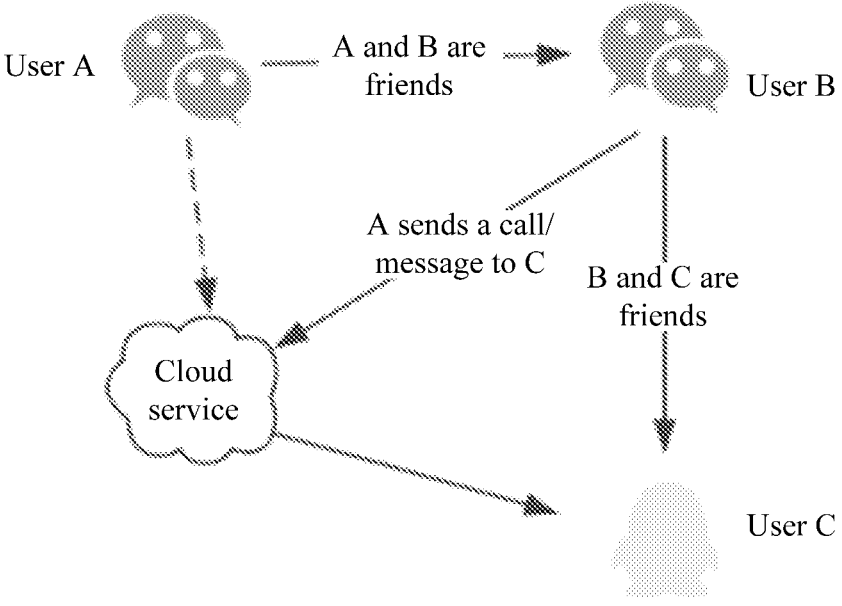
FIG. 8 is a schematic diagram 3 of an interaction process for establishing communication provided by an embodiment of the present application.
Figure 9:
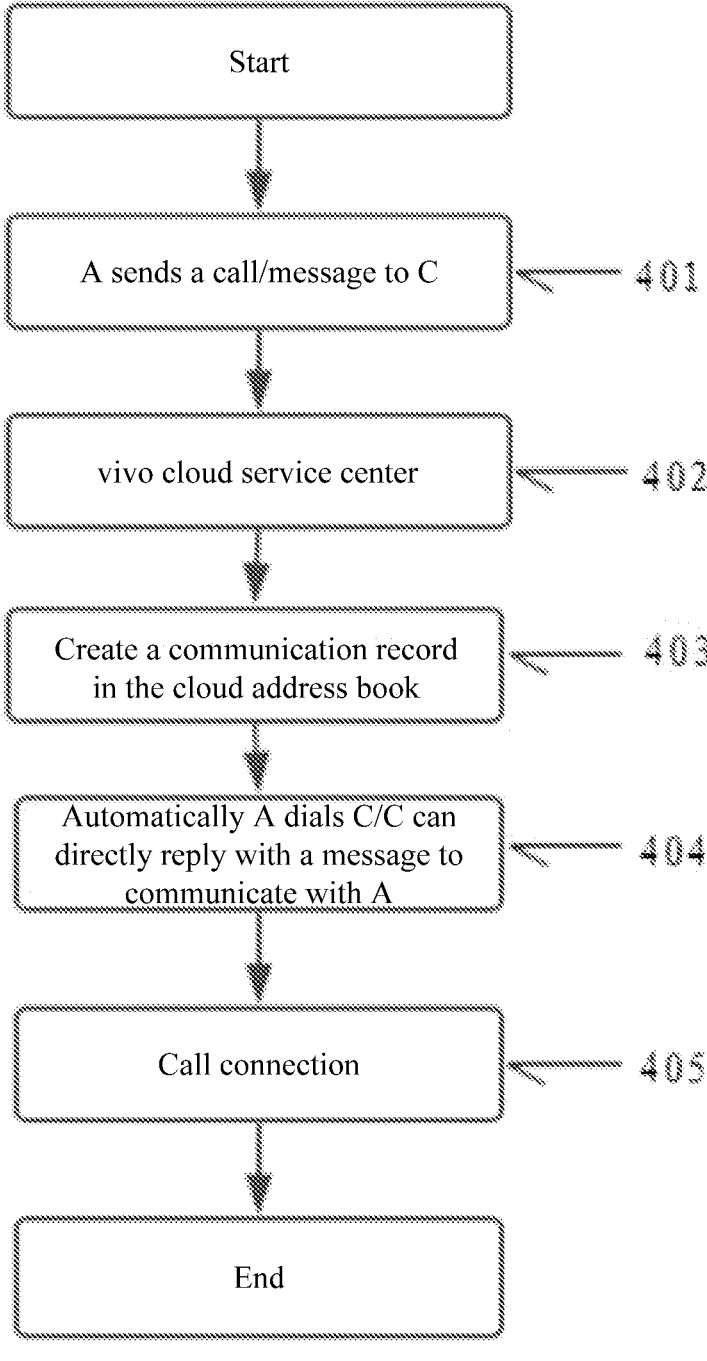
FIG. 9 is a schematic diagram 3 of a specific process for establishing communication provided by an embodiment of the present application.

Specifically, FIG. 8 is a schematic diagram 3 of an interaction process for establishing communication provided by an embodiment of the present application. FIG. 9 is a schematic diagram 3 of a specific process for establishing communication provided by an embodiment of the present application. As shown in FIG. 8 and FIG. 9, the communication establishment method corresponding to the case of communication across social software (with WeChat and QQ as an example) includes the following steps:

Step 401: A and B are WeChat friends, B and C are QQ friends, and B selects the transfer function and selects C in the QQ address book.

Specifically, user B can select the transfer function through the corresponding operation button on the WeChat call (voice call or video call) interface with user A, and further select C in the QQ address book. Certainly, user B may also trigger the transfer function in other manners, which is not specifically limited in this embodiment of the present application. After user B completes the operation, the second electronic device of user B generates a transfer request (that is, a communication assistance request).

Step 402: A vivo cloud service center receives the transfer request.

Step 403: The cloud service enters the address book to automatically establish a record of a relationship between A and C.

Specifically, after receiving the transfer request, the cloud service center enters the cloud address book (the WeChat address book and the QQ address book) of user B to establish a record of the relationship between user A and C based on indication information in the transfer request, and establishes a target communication connection, so as to transfer the call request from user A to user C.

Step 404: A automatically dials the cloud service center, and the cloud service center transfers to C or C agrees to receive information of friend A of B and can directly reply to A through a communication input box with B.

Specifically, after user B completes the operation, the second electronic device of user B sends a transfer request, and at the same time feeds back, to user A, an indication message that has requested assistance. At this time, the first electronic device of user A automatically dials the cloud service center through WeChat (that is, sending voice or video call requests to the cloud service center), and the cloud service center transfers the Alternatively to QQ of user C, so that users A and C can have a normal voice or video call.

In the case of sending a message, this can also be based on a similar method, that is, user A sends a message to user B through WeChat, and user B triggers a communication assistance request, the first electronic device of user A automatically sends the message to the cloud service center, and the cloud service center sends the message to QQ of user C, so that users A and C can communicate via messages normally.

After the record of the relationship between user A and C is established, user A can send a communication message to QQ of C through the WeChat chat window with user B, but when sending the message, user A needs to indicate whether to send the message to user B or user C. If the message is sent to user C, the message is automatically sent to the cloud service center, and sent to QQ of user C through the cloud service center. User C can receive the communication message from user A through the QQ chat window with user B and reply the communication message to A, but when sending a message, user C needs to indicate whether the message is sent to user B or user A. If the message is sent to user A, the message is automatically sent to the cloud service center, and then sent to WeChat of user A through the cloud service center. User A receives the communication message from user C through the WeChat chat window with user B. For the sake of humanity, when the above method is adopted, the communication message can be set to be invisible to user B.

Of course, a new chat window (a WeChat chat window for user A and a QQ chat window for user C) can also be created in each of the electronic devices of user A and user C, so as to realize the communication between the two users through the communication establishment apparatus and avoid unnecessary disturbance to user B.

Step 405: A and C communicate normally or add friends directly.

Specifically, in the above process, regardless of whether user C accepts the call or not, a call record that does not display the QQ account numbers is created on the first electronic device of user A, and correspondingly, a call record that does not display the WeChat account numbers is created on the third electronic device of user C, and subsequently user A and user C can communicate with each other through the call record in their respective electronic devices.

At the same time, user A or C can choose to hide personal information and save the other party in the address book for subsequent communication. Of course, user A or C can also apply to save the contact in plaintext. After the other party agrees, the electronic device can obtain the cloud social account. Considering that saving contacts in WeChat and QQ applications is equivalent to adding friends and requires the consent of the other party, the address book herein can be a new temporary address book different from WeChat and QQ address books, and is used to establish temporary calls. The user can add a friend based on the social account, and after the addition is successful, normal communication can be carried out through social applications such as WeChat or QQ. For example, after the plaintext request is agreed to, user A can obtain the QQ account numbers of user C, and add user C as a QQ friend through the QQ account numbers, so as to communicate normally through the QQ application subsequently.

In the communication establishment method provided in the embodiment of the present application, the first user communicates with the second user and the target user respectively based on social software, where the first user and the second user correspond to the same type of social software, and the first user and the target user correspond to different types of social software. After communicating with the target user, the method further includes: requesting to display the personal information of the target user in plaintext based on the communication record, if the target user agrees to the request, unhiding the personal information of the target user in the target communication connection, and requesting to add the target user as a social software friend through a first account based on the unhidden personal information of the target user, where the first account is an account of the first user in a target social software, and target social software is social software corresponding to the target user, which can achieve normal communication while avoiding privacy leakage.

Figure 10:
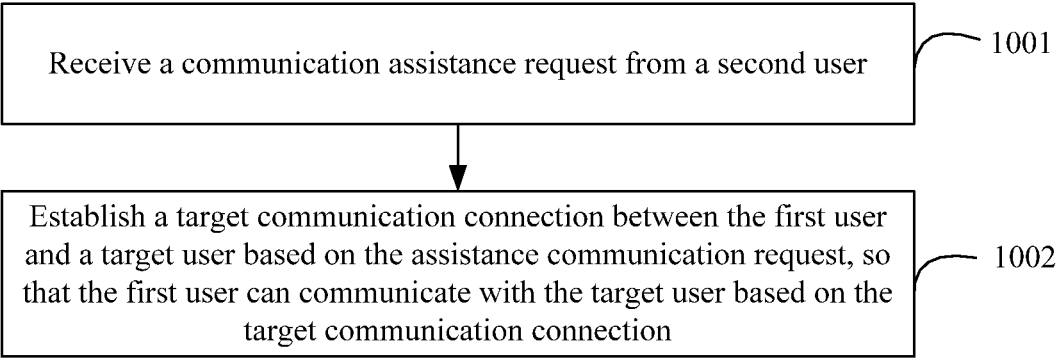
FIG. 10 is a schematic flowchart 2 of a communication establishment method provided by an embodiment of the present application.

FIG. 10 is a schematic flowchart 2 of a communication establishment method provided by an embodiment of the present application. The method is applied to the cloud, and as shown in FIG. 10, the method includes:

Step 1001: Receive a communication assistance request from a second user; where the communication assistance request is generated by a second electronic device of the second user in response to input from the second user during communication between a first user and the second user.

Specifically, the cloud communication establishment apparatus receives a communication assistance request from the second user (user B).

Step 1002: Establish a target communication connection between the first user and a target user based on the assistance communication request, so that the first user can communicate with the target user based on the target communication connection.

Personal information of the target user is hidden in the target communication connection.

Specifically, the cloud communication establishment apparatus establishes a target communication connection between the first user and a target user based on the assistance communication request, so that the first user can communicate with the target user based on the target communication connection.

In the communication establishment method provided in the embodiment of the present application, the communication assistance request from a second user is received, and based on the communication assistance request, a target communication connection between the first user and the target user is established, for the first user to communicate with the target user based on the target communication connection. The personal information of the target user is hidden in the target communication connection, so that communication can be implemented without knowing mobile phone numbers or a network ID of the other party, and the problems of inconvenient user operation and privacy leakage are avoided.

Based on the above embodiment, the establishing a target communication connection between the first user and a target user based on the assistance communication request, so that the first user can communicate with the target user based on the target communication connection includes:

establishing a record of a relationship between the first user and the target user in a cloud address book of the second user based on the assistance communication request; and sending communication information of the first user to the target user based on the record of the relationship;

where the record of the relationship includes personal information of the first user and the target user and a correspondence between the first user and the target user.

Specifically, the cloud communication establishment apparatus establishes a record of a relationship between the user A and the user C in the cloud address book of the user B based on the assistance communication request, and the record of the relationship includes the personal information of the user A and the user C and the correspondence between the user A and the user C. On this basis, the communication establishment apparatus can establish a target communication connection based on the record of the relationship and send the communication information of the user A to user C.

At the same time, if user A requests to save personal information of user C in plaintext and obtains consent of user C, the cloud communication establishment apparatus synchronizes, based on the corresponding indication information, personal information of the target user in the record of the relationship, that is, user C, to the first electronic device of user A.

In the communication establishment method provided in the embodiment of the present application, based on the communication assistance request, a record of the relationship between the first user and the target user is established in the cloud address book of the second user, and based on the record of the relationship, the communication information of the first user is sent to the target user, where the record of the relationship includes the personal information of the first user and the target user and the correspondence between the first user and the target user, so that communication can be implemented without knowing mobile phone numbers or a network ID of the other party, and the problems of inconvenient user operation and privacy leakage are avoided.

Figure 11:
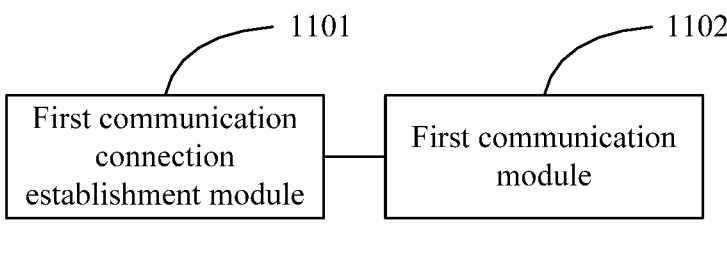
FIG. 11 is a structural schematic diagram 1 of a communication establishment apparatus provided by an embodiment of the present application.

FIG. 11 is a structural schematic diagram 1 of a communication establishment apparatus provided by an embodiment of the present application. The apparatus is applied to the first electronic device of the first user, and as shown in FIG. 11, the apparatus includes:

a first communication connection establishment module 1101, configured to establish a target communication connection with the target user through the second user during the process of communicating with the second user; and a first communication module 1102, configured to communicate with the target user based on the target communication connection.

Personal information of the target user is hidden in the target communication connection.

Specifically, the communication establishment apparatus provided in the embodiment of the present application is used to implement the method in the above corresponding embodiment, and the specific steps of performing the method described in the above corresponding embodiment by the communication establishment apparatus provided in this embodiment are the same as those in the above corresponding embodiment and will not be repeated herein.

Based on any one of the above embodiments, the first user communicates with the second user and the target user respectively based on a telephone call; and the apparatus further includes:

a first plaintext request module, configured to request to display personal information of the target user in plaintext based on a call record;

a user information obtaining module, configured to obtain the personal information of the target user in a case that the target user agrees to the request; and a second communication connection establishment module, configured to establish a first communication connection with the target user, where the personal information of the target user is unhidden in the first communication connection.

Based on any one of the above embodiments, the first user communicates with the second user and the target user respectively based on social software; and the apparatus further includes:

a second plaintext request module, configured to request to display personal information of the target user in plaintext based on a communication record; and a first plaintext display module, configured to unhide the personal information of the target user in the target communication connection when the target user agrees to the request.

Based on any one of the above embodiments, the apparatus further includes:

a first friend adding module, configured to request to add the target user as a social software friend based on the unhidden personal information of the target user.

Based on any one of the above embodiments, the first user communicates with the second user and the target user respectively based on social software; where the first user and the second user correspond to the same type of social software, and the first user and the target user correspond to different social software types; and the apparatus further includes:

a third plaintext request module, configured to request to display personal information of the target user in plaintext based on a communication record; and a second plaintext display module, configured to unhide the personal information of the target user in the target communication connection when the target user agrees to the; and a second friend adding module, configured to request to add the target user as a social software friend through a first account based on the unhidden personal information of the target user, where the first account is an account of the first user in a target social software, and the target social software is social software corresponding to the target user.

Figure 12:
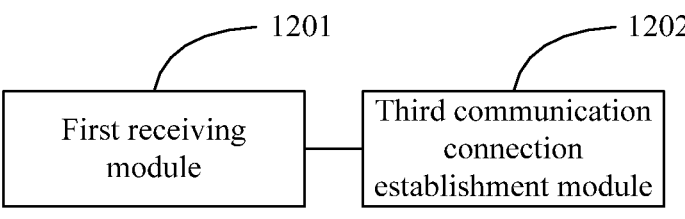
FIG. 12 is a structural schematic diagram 2 of a communication establishment apparatus provided by an embodiment of the present application.

FIG. 12 is a structural schematic diagram 2 of a communication establishment apparatus provided by an embodiment of the present application. The apparatus is applied to the cloud, and as shown in FIG. 12, the apparatus includes:

a first receiving module 1201, configured to receive a communication assistance request from a second user; where the communication assistance request is generated by a second electronic device of the second user in response to input from the second user during communication between a first user and the second user; and a third communication connection establishment module 1202, configured to establish a target communication connection between the first user and a target user based on the assistance communication request, so that the first user can communicate with the target user based on the target communication connection;

where personal information of the target user is hidden in the target communication connection.

Specifically, the communication establishment apparatus provided in the embodiment of the present application is used to implement the method in the above corresponding embodiment, and the specific steps of performing the method described in the above corresponding embodiment by the communication establishment apparatus provided in this embodiment are the same as those in the above corresponding embodiment and will not be repeated herein.

Based on any one of the above embodiments, the establishing a target communication connection between the first user and a target user based on the assistance communication request, so that the first user can communicate with the target user based on the target communication connection includes:

establishing a record of a relationship between the first user and the target user in a cloud address book of the second user based on the assistance communication request; and sending communication information of the first user to the target user based on the record of the relationship;

where the record of the relationship includes personal information of the first user and the target user and a correspondence between the first user and the target user.

The communication establishment apparatus in the embodiment of the present application may be a device, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not specifically limited in this embodiment of the present application.

The communication establishment apparatus in the embodiment of the present application may be an apparatus with an operating system. The operating system may be an Android operating system, an iOS operating system, or another possible operating system. This is not specifically limited in the embodiments of the present application.

The communication establishment apparatus provided in the embodiment of the present application can implement various processes implemented by the communication establishment apparatus in the method embodiment in FIG. 1 to FIG. 10, and details are not repeated here to avoid repetition.

In the communication establishment apparatus applied to the first electronic device of the first user provided in the embodiment of the present application, a target communication connection is established with the target user through the second user during communication with the second user, and based on the target communication connection, communication is performed with the target user, where the personal information of the target user is hidden in the target communication connection. In the communication establishment apparatus applied to the cloud provided in the embodiment of the present application, the communication assistance request from a second user is received, and based on the communication assistance request, a target communication connection between the first user and the target user is established, for the first user to communicate with the target user based on the target communication connection, where the personal information of the target user is hidden in the target communication connection. The communication establishment apparatuses on the electronic device side and cloud side cooperate with each other, so that communication can be implemented without knowing mobile phone numbers or a network ID of the other party, and the problems of inconvenient user operation and privacy leakage are avoided.

Figure 13:
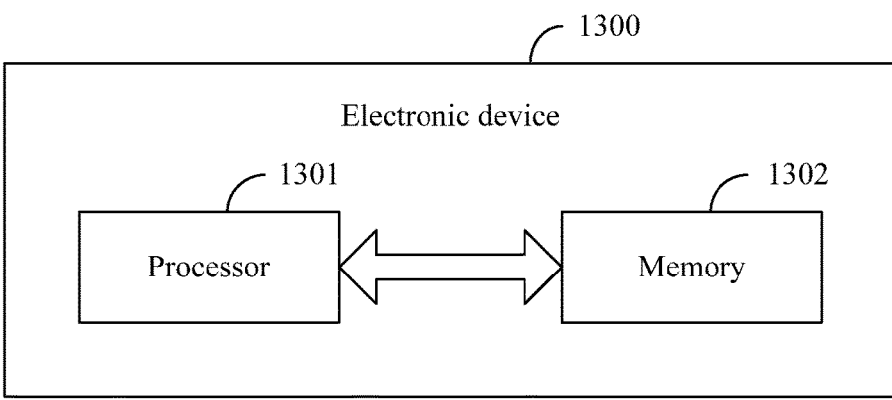
FIG. 13 is a schematic structural diagram of an electronic device provided in an embodiment of the present application.

Optionally, as shown in FIG. 13, the embodiments of the present application further provide an electronic device, including a processor 1301, a memory 1302, and a program or instruction stored in the memory 1302 and executable on the processor 1301, When the program or instruction is executed by the processor 1301, each process of the communication establishment method embodiment described above can be realized, and the same technical effect can be achieved. To avoid repetition, details are not repeated herein.

It should be noted that the electronic device in this embodiment of the present application includes the foregoing mobile electronic device and the foregoing non-mobile electronic device.

Figure 14:
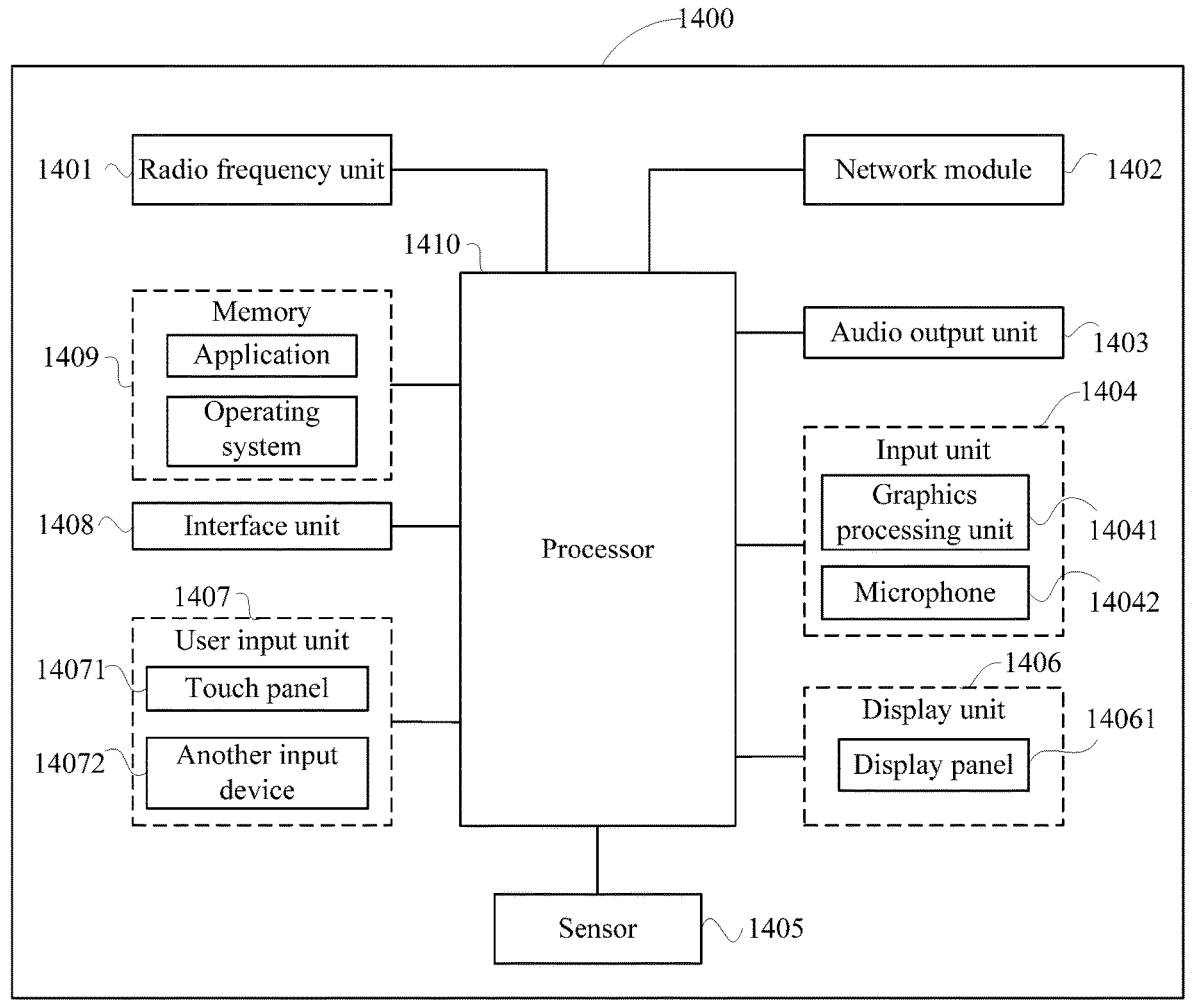
FIG. 14 is a schematic diagram of a hardware structure implementing an electronic device provided by an embodiment of the present application.

FIG. 14 is a schematic diagram of a hardware structure of an electronic device for implementing embodiments of the present application.

An electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

It may be understood by a person skilled in the art that the electronic device 1400 may further include a power supply (such as a battery) that supplies power to each component. The power supply may be logically connected to the processor 1410 by using a power management system, to implement functions such as charging, discharging, and power consumption management by using the power management system. A structure of the electronic device shown in FIG. 14 does not constitute a limitation on the electronic device, and may include more or fewer parts than those shown in the figure, or combine some components, or have different part arrangements. Details are not described herein again.

It should be understood that in this embodiment of the present application, the input unit 1404 may include a graphics processing unit (GPU) 14041 and a microphone 14042. The graphics processing unit 14041 processes image data of a static picture or a video that is obtained by an image capture apparatus (for example, a camera) in a video capture mode or an image capture mode. The display unit 1406 may include a display panel 14061. The display panel 14061 may be configured in a form such as a liquid crystal display or an organic light-emitting diode. The user input unit 1407 includes a touch panel 14071 and another input device 14072. The touch panel 14071 is also referred to as a touchscreen. The touch panel 14071 may include two parts: a touch detection apparatus and a touch controller. The another input device 14072 may include but is not limited to a physical keyboard, a functional button (such as a volume control button or a power on/off button), a trackball, a mouse, and a joystick. Details are not described herein.

The memory 1409 may be configured to store a software program or an instruction and various data. The memory 1409 may mainly include a program or instruction storage area and a data storage area. The program or instruction storage area may store an operating system, and an application or an instruction required by at least one function (for example, a sound playing function or an image playing function). In addition, the memory 1409 may include a high-speed random-access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 1410 may include one or more processing units. Optionally, an application processor and a modem processor may be integrated into the processor 1410. The application processor mainly processes an operating system, a user interface, an application, an instruction, or the like. The modem processor mainly processes wireless communications, for example, a baseband processor. It can be understood that, alternatively, the modem processor may not be integrated into the processor 1410.

In the first aspect, the radio frequency unit 1401 is configured to establish a target communication connection with a target user through the second user during communication with a second; and is further configured to communicate with the target user based on the target communication connection.

Personal information of the target user is hidden in the target communication connection.

In the electronic device provided in the embodiments of the present application, in the process of communicating with the second user, the target communication connection is established with the target user through the second user, and based on the target communication connection, communication is performed with the target user. The personal information of the target user is hidden in the target communication connection, so that communication can be implemented without knowing mobile phone numbers or a network ID of the other party, and the problems of inconvenient user operation and privacy leakage are avoided.

Optionally, the radio frequency unit 1401 is further configured to request to display personal information of the target user in plaintext based on a call record;

obtain the personal information of the target user in a case that the target user agrees to the request; and establish a first communication connection with the target user, where the personal information of the target user is unhidden in the first communication connection.

The electronic device provided in the embodiment of the present application requests to display the personal information of the target user in plaintext based on the call record, obtains the personal information of the target user when the target user agrees to the request, and establishes a first communication connection with the target user, where the personal information of the target user is unhidden in the first communication connection, to enable telephone calls between users while avoiding user operation inconvenience and privacy leakage.

Optionally, the radio frequency unit 1401 is further configured to request to display personal information of the target user in plaintext based on a communication record. The processor 1410 is configured to unhide the personal information of the target user in the target communication connection when the target user agrees to the request.

The electronic device provided in the embodiment of the present application requests to display the personal information of the target user in plaintext based on the communication record, and if the target user agrees to the request, the personal information of the target user in the target communication connection is unhidden, which can provide contact information based on the user intent to avoid the problem of privacy leakage.

The radio frequency unit 1401 is further configured to request to add the target user as a social software friend based on the unhidden personal information of the target user.

The electronic device provided in the embodiment of the present application requests to add the target user as a social software friend based on the unhidden personal information of the target user, which can provide contact information based on the user intent to avoid the problem of privacy leakage while ensuring normal communication.

The radio frequency unit 1401 is further configured to request to display personal information of the target user in plaintext based on a communication record; and is further configured to request to add the target user as a social software friend through a first account based on the unhidden personal information of the target user, where the first account is an account of the first user in a target social software, and the target social software is social software corresponding to the target user.

The processor 1410 is further configured to unhide the personal information of the target user in the target communication connection when the target user agrees to the request.

The electronic device provided in the embodiment of the present application requests to display the personal information of the target user in plaintext based on the communication record, if the target user agrees to the request, unhides the personal information of the target user in the target communication connection, and requests to add the target user as a social software friend through a first account based on the unhidden personal information of the target user, where the first account is an account of the first user in a target social software, and the target social software is social software corresponding to the target user, which can achieve normal communication while avoiding privacy leakage.

In the second aspect, the radio frequency unit 1401 is configured to receive a communication assistance request from a second user; where the communication assistance request is generated by a second electronic device of the second user in response to input from the second user during communication between a first user and the second user; and The processor 1410 is configured to establish a target communication connection between the first user and a target user based on the assistance communication request, so that the first user can communicate with the target user based on the target communication connection.

Personal information of the target user is hidden in the target communication connection.

In the electronic device provided in the embodiment of the present application, the communication assistance request from a second user is received, and based on the communication assistance request, a target communication connection between the first user and the target user is established, for the first user to communicate with the target user based on the target communication connection. The personal information of the target user is hidden in the target communication connection, so that communication can be implemented without knowing mobile phone numbers or a network ID of the other party, and the problems of inconvenient user operation and privacy leakage are avoided.

The processor 1410 is further configured to establish a record of a relationship between the first user and the target user in a cloud address book of the second user based on the assistance communication request.

The radio frequency unit 1401 is further configured to send the communication information of the first user to the target user based on the record of the relationship;

where the record of the relationship includes personal information of the first user and the target user and a correspondence between the first user and the target user.

In the electronic device provided in the embodiment of the present application, based on the communication assistance request, a record of the relationship between the first user and the target user is established in the cloud address book of the second user, and based on the record of the relationship, the communication information of the first user is sent to the target user, where the record of the relationship includes the personal information of the first user and the target user and the correspondence between the first user and the target user, so that communication can be implemented without knowing mobile phone numbers or a network ID of the other party, and the problems of inconvenient user operation and privacy leakage are avoided.

An embodiment of the present application further provides a readable storage medium. The readable storage medium stores a program or an instruction, and when the program or the instruction is executed by a processor, the various processes of the foregoing communication establishment method embodiment is performed and the same technical effects can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing communication establishment method and the same technical effects can be achieved. To avoid repetition, details are not described herein again.

It should be understood that the chip mentioned in this embodiment of the present application may also be referred to as a system-level chip, a system chip, a chip system, or an on-chip system chip.

It should be noted that in this specification, the term "include", "comprise", or any other variant is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of the present application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. In most cases, the former is a preferred implementation. Based on such an understanding, the technical solutions of the present application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

The embodiments of the present application are described above in conjunction with the accompanying drawings, but the present application is not limited to the above specific implementations, and the above specific implementations are only illustrative and not restrictive. Enlightened by the present application, a person of ordinary skill in the art can make many forms without departing from the purpose of the present application and the protection scope of the claims, all of which shall fall within the protection of the present application.

What is claimed is:

1. A communication establishment method, applied to a first electronic device of a first user, wherein the method comprises:

establishing a target communication connection with a target user through a second user during communication with the second user; and communicating with the target user based on the target communication connection;

wherein personal information of the target user is hidden in the target communication connection;

wherein the first user communicates with the second user and the target user respectively based on social software; wherein the first user and the second user correspond to the same type of social software, and the first user and the target user correspond to different social software types; and after communicating with the target user, the method further comprises:

requesting to display personal information of the target user in plaintext based on a communication record; and unhiding the personal information of the target user in the target communication connection when the target user agrees to the request; and requesting to add the target user as a social software friend through a first account based on the unhidden personal information of the target user, wherein the first account is an account of the first user in a target social software, and the target social software is social software corresponding to the target user.

2. A non-transitory readable storage medium, storing a program or an instruction, wherein the program or instruction is configured to be executed by a processor to implement steps of the communication establishment method according to claim 1.

3. A communication establishment method, applied to the cloud, wherein the method comprises:

receiving a communication assistance request from a second user; wherein the communication assistance request is generated by a second electronic device of the second user in response to input from the second user during communication between a first user and the second user; and establishing a target communication connection between the first user and a target user based on the assistance communication request, so that the first user can communicate with the target user based on the target communication connection;

wherein personal information of the target user is hidden in the target communication connection;

wherein the establishing a target communication connection between the first user and a target user based on the assistance communication request, so that the first user can communicate with the target user based on the target communication connection comprises:

establishing a record of a relationship between the first user and the target user in a cloud address book of the second user based on the assistance communication request; and sending communication information of the first user to the target user based on the record of the relationship;

wherein the record of the relationship comprises personal information of the first user and the target user and a correspondence between the first user and the target user.

4. An electronic device, wherein the electronic device is an electronic device of a cloud, and the electronic device comprises a processor, a memory, and a program or instruction stored on the memory and executable on the processor, wherein the processor is configured to execute the program or instruction to implement steps of the communication establishment method according to claim 3.

5. A non-transitory readable storage medium, storing a program or an instruction, wherein the program or instruction is configured to be executed by a processor to implement steps of the communication establishment method according to claim 3.

6. An electronic device, wherein the electronic device is a first electronic device of a first user, and the electronic device comprises a processor, a memory, and a program or instruction stored on the memory and executable on the processor, wherein the processor is configured to execute the program or instruction to implement following steps:

establishing a target communication connection with a target user through a second user during communication with the second user; and communicating with the target user based on the target communication connection;

wherein personal information of the target user is hidden in the target communication connection;

wherein the first user communicates with the second user and the target user respectively based on social software; wherein the first user and the second user correspond to the same type of social software, and the first user and the target user correspond to different social software types; and after communicating with the target user, the processor is configured to execute the program or instruction to further implement:

requesting to display personal information of the target user in plaintext based on a communication record; and unhiding the personal information of the target user in the target communication connection when the target user agrees to the request; and requesting to add the target user as a social software friend through a first account based on the unhidden personal information of the target user, wherein the first account is an account of the first user in a target social software, and the target social software is social software corresponding to the target user.

* * * * *